US011954366B2

(12) United States Patent
Agarwal et al.

(10) Patent No.: US 11,954,366 B2
(45) Date of Patent: Apr. 9, 2024

(54) DATA STORAGE DEVICE WITH MULTI-COMMANDS

(71) Applicant: Western Digital Technologies, Inc., San Jose, CA (US)

(72) Inventors: Dinesh Kumar Agarwal, Bangalore (IN); Vijay Sivasankaran, Dublin, CA (US); Mikhail Palityka, Oakville (CA)

(73) Assignee: Western Digital Technologies, Inc., San Jose, CA (US)

( * ) Notice: Subject to any disclaimer, the term of this patent is extended or adjusted under 35 U.S.C. 154(b) by 24 days.

(21) Appl. No.: 17/825,824

(22) Filed: May 26, 2022

(65) Prior Publication Data

US 2023/0384974 A1 Nov. 30, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0658* (2013.01); *G06F 3/0679* (2013.01)

(58) Field of Classification Search
CPC .... G06F 3/0659; G06F 3/0604; G06F 3/0658; G06F 3/0679
See application file for complete search history.

(56) References Cited

U.S. PATENT DOCUMENTS

| 10,685,722 B1 * | 6/2020 | Sharma ..................... G11C 7/02 |
| 2022/0083266 A1 * | 3/2022 | Prakash ................ G06F 3/0679 |

\* cited by examiner

*Primary Examiner* — Gurtej Bansal
(74) *Attorney, Agent, or Firm* — Michael Best & Friedrich LLP

(57) ABSTRACT

Providing constant fixed commands to memory dies within a data storage device may result in hardware and firmware overheads impacting the performance at a flash interface module (FIM) because the FIM has to handle both the constant fixed commands and the overheads associated with the constant fixed commands. To avoid the impact on performance at the FIM, multiple fixed commands may be combined into individual multi-commands that may be provided to the memory dies. The use of multi-commands reduces hardware and firmware overheads at the FIM relative to the constant fixed commands, which improves performance of the data storage device because the saturation of the FIM is decreased.

17 Claims, 6 Drawing Sheets

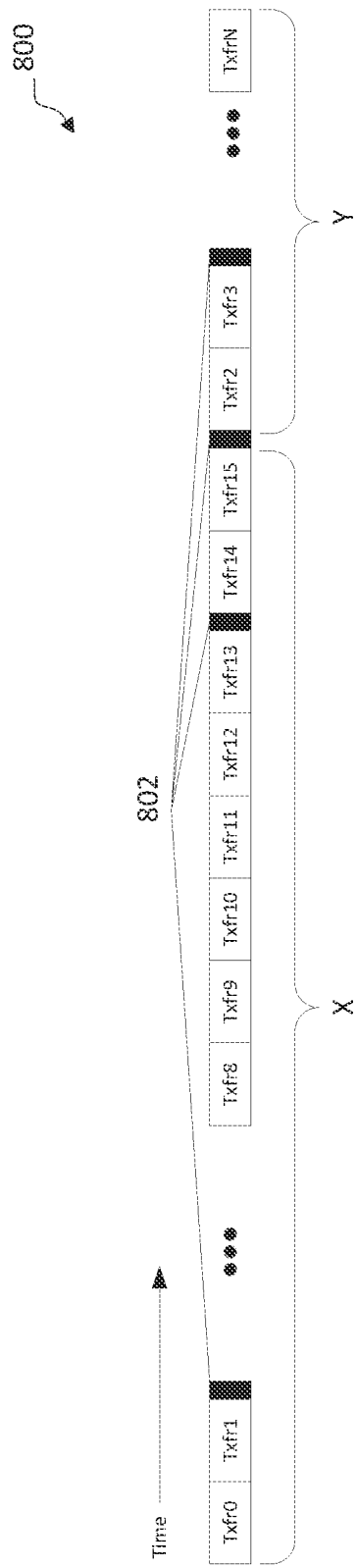
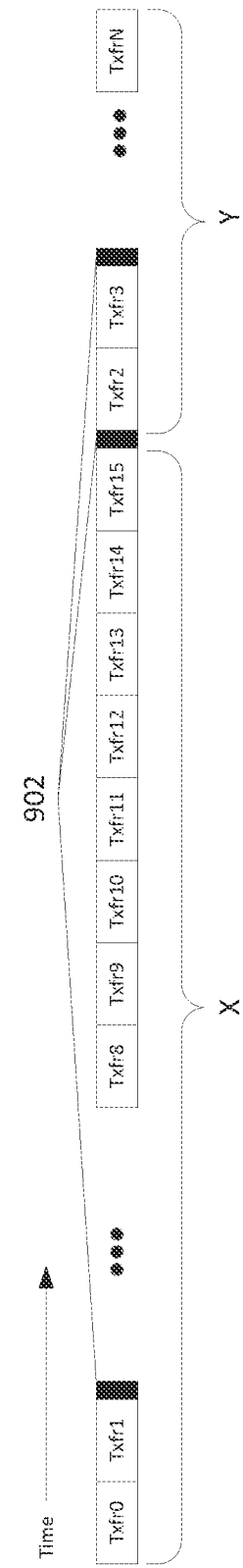

DATA STORAGE DEVICE WITH MULTI-COMMANDS

FIELD

This application relates generally to data storage devices, and more particularly, to data storage devices with multi-commands to reduce saturation of a flash interface module (FIM).

BACKGROUND

Generally, data storage devices, and specifically retail data storage devices, adhere to known or preset power restrictions to ensure maximum throughput of data through the data storage device. To obtain maximum throughput, the data storage device requires most or all of the memory dies within the data storage device to work in parallel. Accordingly, data storage devices typically consider and prioritize the power requirements of the memory dies first, such that the power is allocated to allow for each of the memory dies to have the maximum usable power available when needed.

However, with the increasing number of planes and lower read time with Asynchronous Independent Plane Reads (AIPR), NAND is no longer the bottleneck for random read performance. Instead, for high random read performance scenarios, the flash interface module (FIM) bus is more of a bottleneck to maximum throughput of data than the NAND for random read performance.

SUMMARY

Providing constant fixed commands to memory dies within a data storage device may result in hardware and firmware overheads impacting the performance at the FIM because the FIM has to handle both the constant fixed commands and the overheads associated with the constant fixed commands.

Multiple fixed commands may be combined into a single command (also referred to herein as a "multi-command") that may be provided to the plurality of dies. The use of multi-commands reduces hardware and firmware overheads at the FIM relative to the constant fixed commands, which improves performance of the data storage device because the saturation of the FIM is decreased.

Additionally, the combination of multiple commands into a multi-command may be based on the parallelism available at the memory. Further, the parallelism available at the memory may be dynamically determined based on one or more of a speed of a bus, a total number of outstanding commands available at a FIM, and total commands available in a data storage device.

One embodiment of the present disclosure includes a data storage device. The data storage device includes a memory including a plurality of memory dies, the memory configured to: read data from the plurality of memory dies using one or more multi-commands, and perform asynchronous independent plane reads (AIPR) on the plurality of memory dies. The data storage device also includes a data storage controller including a flash interface module (FIM) configured to communicate with the memory using a bus and channel transfers on the bus. The channel transfers include a plurality of data transfers of the data that is read and a plurality of overheads associated with performing the AIPR on the plurality of memory dies, and a number of the plurality of overheads is less than a number of the plurality of data transfers.

Another embodiment of the present disclosure includes a method. The method includes reading, with a memory, data from a plurality of memory dies using one or more multi-commands. The method includes performing, with the memory, asynchronous independent plane reads (AIPR) on the plurality of memory dies. The method also includes communicating, with the memory, the data that is read to a flash interface module (FIM) with a bus and channel transfers on the bus. The channel transfers include a plurality of data transfers of the data that is read and a plurality of overheads associated with performing the AIPR on the plurality of memory dies, and a number of the plurality of overheads is less than a number of the plurality of data transfers.

Yet another embodiment of the present disclosure includes an apparatus. The apparatus includes means for reading data from a plurality of memory dies using one or more multi-commands. The apparatus includes means for performing asynchronous independent plane reads (AIPR) on the plurality of memory dies. The apparatus also includes means for communicating the data that is read to a flash interface module (FIM) with a bus and channel transfers on the bus. The channel transfers include a plurality of data transfers of the data that is read and a plurality of overheads associated with performing the AIPR on the plurality of memory dies, and a number of the plurality of overheads is less than a number of the plurality of data transfers.

Various aspects of the present disclosure provide for improvements in data storage devices. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

BRIEF DESCRIPTION OF THE DRAWINGS

FIG. 8 is a diagram illustrating a second example of channel transfers from the multi-commands of FIG. 6, in accordance with various aspects of the present disclosure.

FIG. 9 is a diagram illustrating a third example of channel transfers from the multi-commands of FIG. 7, in accordance with various aspects of the present disclosure.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein may be applicable to other types of solid-state memory, such as NOR, PCM ("Phase Change Memory"), ReRAM, or other suitable solid-state memory.

Figure 1:
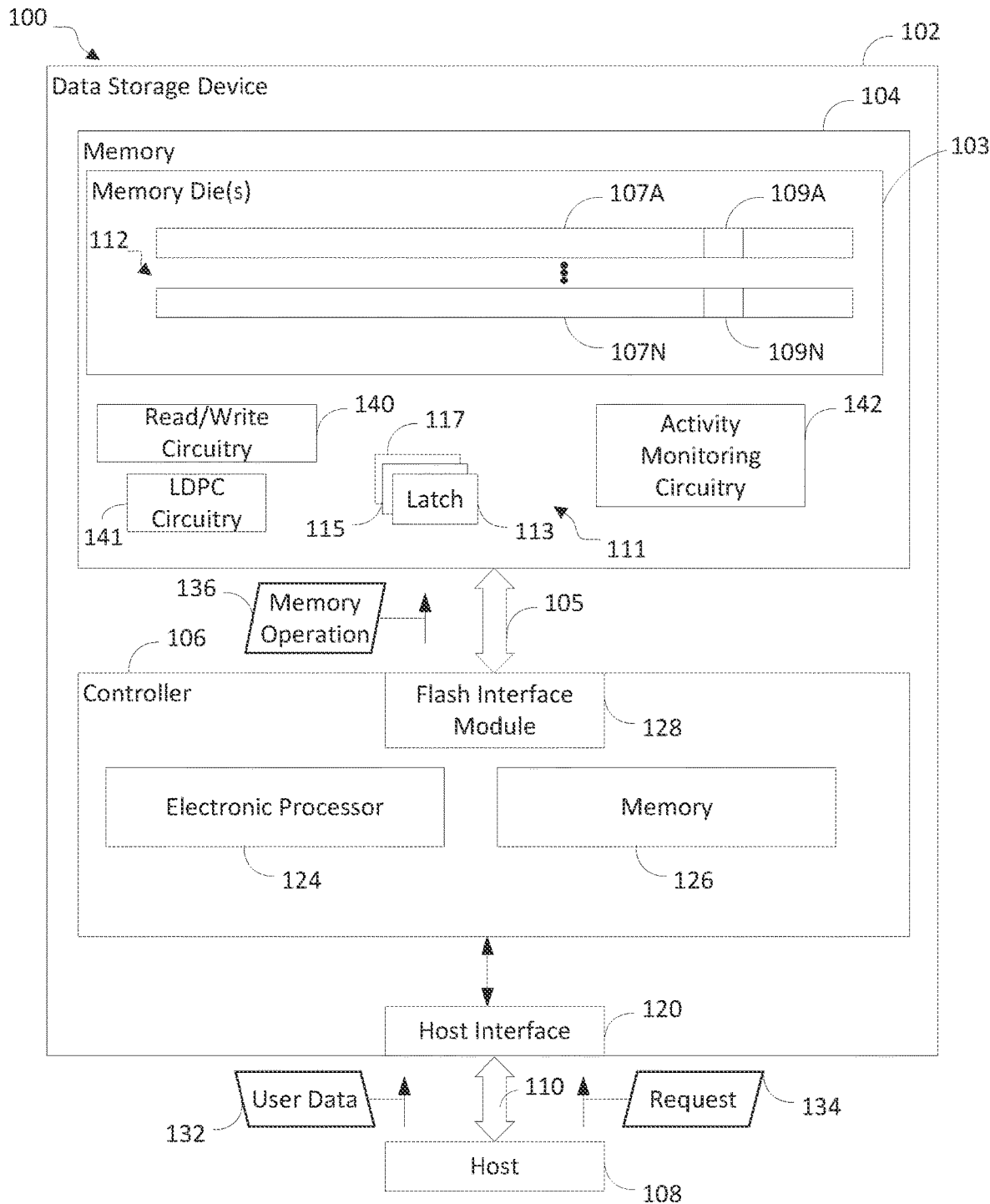
FIG. 1 is block diagram of a system including a data storage device and a host device, in accordance with some embodiments of the disclosure.

FIG. 1 is block diagram of a system including a data storage device and a host device, in accordance with some embodiments of the disclosure. In the example of FIG. 1, the system 100 includes a data storage device 102 in communication with a host device 108. The data storage device 102 includes a memory 104 (e.g. non-volatile memory) that is coupled to a controller 106.

One example of the structural and functional features provided by the controller 106 are illustrated in FIG. 1. However, the controller 106 is not limited to the structural and functional features provided by the controller 106 in FIG. 1. The controller 106 may include fewer or additional structural and functional features that are not illustrated in FIG. 1.

The data storage device 102 and the host device 108 may be operationally coupled with a connection (e.g., a communication path 110), such as a bus or a wireless connection. In some examples, the data storage device 102 may be embedded within the host device 108. Alternatively, in other examples, the data storage device 102 may be removable from the host device 108 (i.e., "removably" coupled to the host device 108). As an example, the data storage device 102 may be removably coupled to the host device 108 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 108 with the communication path 110, such as a wired communication path and/or a wireless communication path. For example, the data storage device 102 may include an interface 120 (e.g., a host interface) that enables communication with the communication path 110 between the data storage device 102 and the host device 108, such as when the interface 120 is communicatively coupled to the host device 108.

The host device 108 may include a processor and a memory. The memory may be configured to store data and/or instructions that may be executable by the processor. The memory may be a single memory or may include one or more memories, such as one or more non-volatile memories, one or more volatile memories, or a combination thereof. The host device 108 may issue one or more commands to the data storage device 102, such as one or more requests to erase data at, read data from, or write data to the memory 104 of the data storage device 102. For example, the host device 108 may be configured to provide data, such as user data 132, to be stored at the memory 104 or to request data to be read from the memory 104. The host device 108 may include a mobile smartphone, a music player, a video player, a gaming console, an electronic book reader, a personal digital assistant (PDA), a computer, such as a laptop computer or notebook computer, any combination thereof, or other suitable electronic device.

The host device 108 communicates with a memory interface that enables reading from the memory 104 and writing to the memory 104. In some examples, the host device 108 may operate in compliance with an industry specification, such as a Universal Flash Storage (UFS) Host Controller Interface specification. In other examples, the host device 108 may operate in compliance with one or more other specifications, such as a Secure Digital (SD) Host Controller specification or other suitable industry specification. The host device 108 may also communicate with the memory 104 in accordance with any other suitable communication protocol.

The memory 104 of the data storage device 102 may include a non-volatile memory (e.g., NAND flash or other suitable solid-state memory, where read process happens in multiple steps: 1) where sense operation is done, 2) a status check is performed to see if the data is ready to be toggled out, and then 3) the data transfer). In some examples, the memory 104 may be any type of flash memory. For example, the memory 104 may be two-dimensional (2D) memory or three-dimensional (3D) flash memory. The memory 104 may include one or more memory dies 103. Each of the one or more memory dies 103 may include one or more memory blocks 112 (e.g., one or more erase blocks). Each memory block 112 may include one or more groups of storage elements, such as a representative group of storage elements 107A-107N. The group of storage elements 107A-107N may be configured as a wordline. The group of storage elements 107A-107N may include multiple storage elements (e.g., memory cells that are referred to herein as a "string"), such as a representative storage elements 109A and 109N, respectively.

The memory 104 may include support circuitry, such as read/write circuitry 140, low-density parity check ("LDPC") circuitry 141, and activity monitoring circuitry 142 to support operation of the one or more memory dies 103. Although depicted as a single component, the read/write circuitry 140 may be divided into separate components of the memory 104, such as read circuitry and write circuitry.

The read/write circuitry 140 may be external to the one or more memory dies 103 of the memory 104. Alternatively, one or more individual memory dies 103 may include corresponding read/write circuitry 140 that is operable to read from and/or write to storage elements within the individual memory die independent of any other read and/or write operations at any of the other memory dies.

The LDPC circuitry 141 is configured to perform parity checks and other error correction on data retrieved by and/or sent to the memory dies 103. Accordingly, the LDPC circuitry 141 is configured to address bit errors within data transferred to/from the memory dies 103.

Similarly, the activity monitoring circuitry 142 may be external to the one or more memory dies 103 and to the memory 104. For example, the activity monitoring circuitry 142 may be embodied in the controller 106 as separate hardware circuitry or firmware. Alternatively, one or more individual memory dies 103 may include corresponding activity monitoring circuitry 142 that is operable to monitor activity, described below, within one die of the individual memory dies 103 independent of any activity monitoring at any of the other dies of the individual memory dies 103. In some examples, one or more activity monitoring operations may be performed using the activity monitoring circuitry 142. Specifically, the activity monitoring circuitry 142 may monitor the memory die usage of the memory 104.

In some embodiments, the activity monitoring circuitry 142 provides the data related to the utilization of the memory dies 103 to the controller 106. The controller 106 may then perform some or all of the operations described below with respect to FIGS. 4-10. In other embodiments, the activity monitoring circuitry 142 uses the data related to the utilization of the memory dies 103 to perform the operations described below with respect to FIGS. 4-10.

The memory 104 may further include one or more latches (e.g., a set of latches 111 including latches 113, 115, and 117). The latches hold data to be transferred to the controller 106.

The activity monitoring circuitry 142 may be formed using logic gates such as AND, OR, XOR, and NOT gates, or programmable logic gates. In other examples, the activity monitoring circuitry 142 may be omitted from the memory 104, and operations described with reference to the activity monitoring circuitry 142 may be performed by the read/write circuitry 140.

In still further examples, the activity monitoring circuitry 142 may be omitted from the memory 104, and operations described with reference to the activity monitoring circuitry 142 may be performed by circuitry located anywhere in either the memory 104 or the controller 106. Assuming the circuitry is located in the controller 106 (e.g., an electronic processor executing activity monitoring software in the controller memory 126), the controller 106 performs the operations described with reference to the activity monitoring circuitry 142, then the controller 106 may track the state of each dice/plane using the FIM 128 and there is no need to have commands replicated for each dice/plane. Also, the controller 106 may perform some predictive monitoring (i.e., predicting the plane is going to be ready after certain number of microseconds) and perform a decision based on this predictive monitoring.

The controller 106 is coupled to the memory 104 (e.g., the one or more memory dies 103) with a Flash Interface Module (FIM) 128 and a bus 105, an interface (e.g., interface circuitry), another structure, or a combination thereof. For example, the bus 105 may include multiple distinct channels to enable the FIM 128 to communicate with each of the one or more memory dies 103 in parallel with, and independently of, communication with the other memory dies 103.

The FIM 128 may include a queue manager and/or a flash translation layer (FTL). The FIM 128 may generate the sense/transfer or program operations to the memory 104. The FIM 128 interacts with the memory 104 by sending commands and receiving data transfers from the memory 104.

The controller 106 is configured to receive data and instructions from the host device 108 and to send data to the host device 108. For example, the controller 106 may send data to the host device 108 with the interface 120, and the controller 106 may receive data from the host device 108 with the interface 120. The controller 106 is configured to send data and commands (e.g., the memory operation 136, which may be a cycle operation of a memory block of the memory 104) to the memory 104 and to receive data from the memory 104. For example, the controller 106 is configured to send data and a program or write command to cause the memory 104 to store data to a specified address of the memory 104. The write command may specify a physical address of a portion of the memory 104 (e.g., a physical address of a word line of the memory 104) that is to store the data.

The controller 106 is configured to send a read command to the memory 104 to access data from a specified address of the memory 104. The read command may specify the physical address of a region of the memory 104 (e.g., a physical address of a word line of the memory 104). The controller 106 may also be configured to send data and commands to the memory 104 associated with background scanning operations, garbage collection operations, and/or wear-leveling operations, or other suitable memory operations.

The controller 106 may include a processor 124 and a memory 126. The memory 126 may be configured to store data and/or instructions that may be executable by the processor 124.

The controller 106 may control the FIM 128 to send the memory operation 136 (e.g., a read command) to the memory 104. In some examples, the controller 106 may control the FIM 128 to send the memory operation 136 to cause the read/write circuitry 140 to sense data stored in a storage element when the memory operation 136 is a read command. For example, the controller 106 may control the FIM 128 to send the read command to the memory 104 in response to receiving a request for read access from the host device 108. In response to receiving the read command, the memory 104 may sense the storage element 107A (e.g., using the read/write circuitry 140) to generate one or more sets of bits representing the stored data.

In other examples, the controller 106 may control the FIM 128 to send the memory operation 136 to cause the read/write circuitry 140 to store data in a storage element when the memory operation 136 is a write command with the data for storage. For example, the controller 106 may control the FIM 128 to send the write command and the data to the memory 104 in response to receiving a request for write access by the host device 108.

In view of the foregoing, the FIM 128 is facilitating multiple actions. In one action, the FIM 128 is facilitating the transfer of data to and from the memory 126. In a second action, the FIM 128 is facilitating the transfer of commands from the controller 106 to the support circuitry (e.g., the read/write circuitry 140, the LDPC circuitry 141, and/or the activity monitoring circuitry 142) in the memory 104. Whatever overheads exist in transferring the data and/or commands between the controller 106 and the memory 104, the overheads reduce the performance of the data storage device 102 (e.g., overheads reduce the performance of AIPR).

The efficiency of the FIM 128 is lower during random read scenarios. However, by choosing the parallelism at the NAND to saturate the NAND instead of the FIM 128, the efficiency of the FIM 128 may be increased. With respect to AIPR, the parallelism includes issuing the reads at different points of time but tracking the completion of the multiple reads simultaneously. This parallelism helps in reducing FIM command overheads and maximizing the performance of the data storage device 102. The parallelism is decided dynamically based on the bus speed of the bus 105, total outstanding commands available at the FIM 128, and commands available in the data storage device 102.

Figure 2:
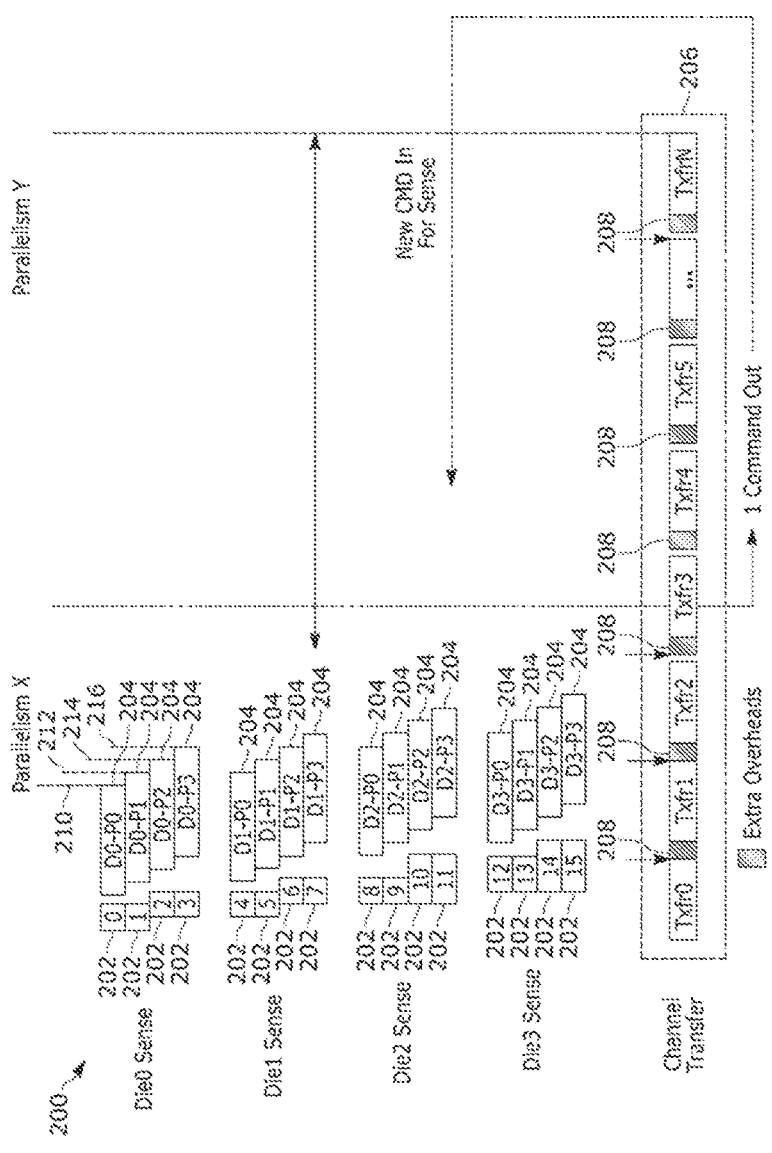
FIG. 2 is a diagram illustrating an example of high FIM inefficiencies for AIPR on an individual plane basis.

FIG. 2 is a diagram illustrating an example 200 of high FIM inefficiencies for AIPR on an individual plane basis. FIG. 2 is described with respect to FIG. 1.

In FIG. 2, the example 200 includes a plurality of sense commands 202, a plurality of data commands 204, and channel transfers 206. The plurality of sense commands 202 includes sense commands 0-15. The plurality of data commands 204 includes a first command D0-P0 (i.e., a command associated with die0 and plane0) corresponding to sense command 0. The plurality of data commands 204 includes sixteen total commands (i.e., first command D0-P0 through sixteenth command D3-P3), each of the sixteen commands corresponding to one of the sense commands.

In the example of FIG. 2, the first sense command 0 is sent to the memory 104 to cause the memory 104 to sense the data (e.g., 4 KB of data). The sensed data is brought to the latches 113, 115, and 117, where the sensed data is held before being transferred to the controller 106.

After sending the plurality of sense commands 202, the plurality of data commands 204 are sent to the memory 104 in parallelism X, where the plurality of data commands 204 are associated with the data transfer. Upon receiving the plurality of commands 204, the memory 104 makes sure that the die or independent plane with the data is ready for the data transfer. For example, the activity monitoring circuitry 142 checks whether the die or the independent plane with the data is ready for the data transfer.

The activity monitoring circuitry 142 may check the die or the independent plane continuously or based on trigger events. For example, the activity monitoring circuitry 142 may check the die or the independent plane based on the completion of each of the plurality of commands 204. These checks by the activity monitoring circuitry 142 are indicated by check lines 210-216. In some examples, the triggered events may be due to a timer expiration or if the FIM 128 is idle then it can also send additional tracking requests. The triggered events are also part of predictive monitoring where tracking can be done after specified time as the approximate time is known when the plane is going to be available next.

The check line 210 indicates a check of die 0 and plane 0 after the completion of the first command D0-P0 of the plurality of commands 204. The check line 212 indicates a check of die 0 and plane 1 after the completion of the second command D0-P1 of the plurality of commands 204. The check line 214 indicates a check of die 0 and plane 2 after the completion of the third command D0-P2 of the plurality of commands 204. The check line 216 indicates a check of die 0 and plane 3 after the completion of the fourth command D0-P3 of the plurality of commands 204. Additionally, although check lines are not illustrated with respect to die 1, die 2, and die 3, check lines similar to the check lines 210-216 are equally applicable to each of die 1, die 2, and die 3.

In the channel transfers 206, the overheads 208 represent the extra work (e.g., the checks by the activity monitoring circuitry 142) that the memory 104 needs to do in order to transfer over the data from the memory 104 to the controller 106. The overheads are broken into multiple parts and represent commands for making sure that the correct corresponding plane is ready (e.g., associated with check lines 210-216), bringing data to the latches 113, 115, and 117, and transferring the data with data transfers Txfr0-TxfrN.

In the channel transfers 206, the overheads 208 amount to a large percentage because an overhead is for each 4 KB of data in random IOPs in the random path. In the example of FIG. 2, the overheads are roughly 40% to 50%, and the efficiency of the FIM 128 drops from 100% to between 50% and 60%. Additionally, with the speed of the data transfers Txfr0-TxfrN, the FIM 128 will saturate faster than saturation of the memory 104 due to the limited bandwidth of the FIM 128 and the additional commands being sent to the FIM 128 during random operations.

Figure 3:
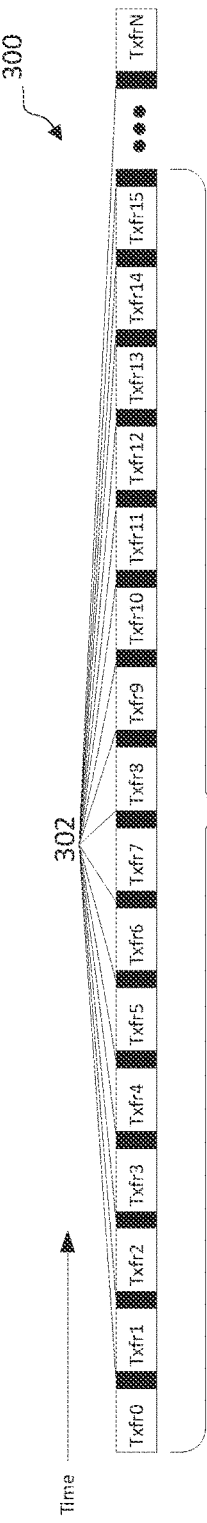
FIG. 3 is a diagram illustrating an expanded example of channel transfers from the commands of FIG. 2.

FIG. 3 is a diagram illustrating an expanded example 300 of the channel transfers 206 from the commands 204 of FIG. 2. In the expanded example 300, all of the data transfers Txfr0-TxfrN are associated with one of the plurality of overheads 302. In other words, N data transfers results in N overheads, where N is a positive integer.

Figure 4:
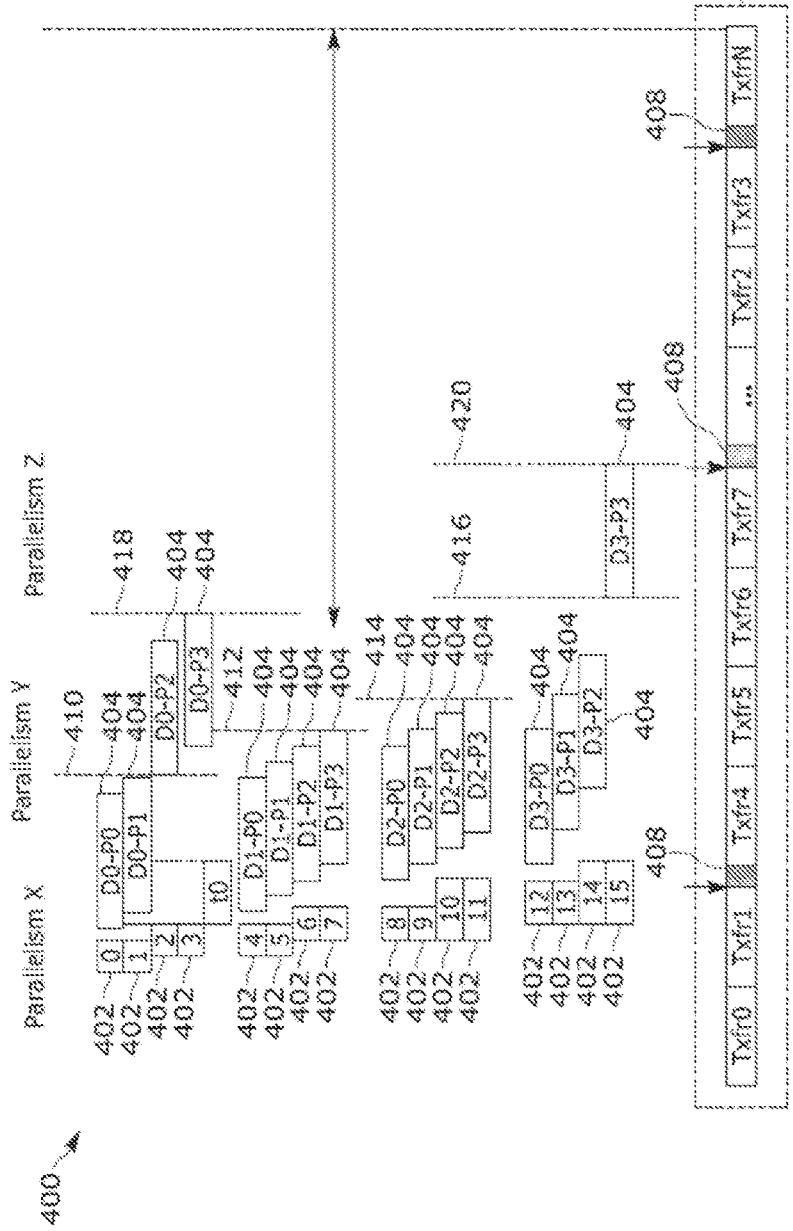
FIG. 4 is a diagram illustrating a first example of multi-commands, in accordance with various aspects of the present disclosure.
Figures 6, 7:
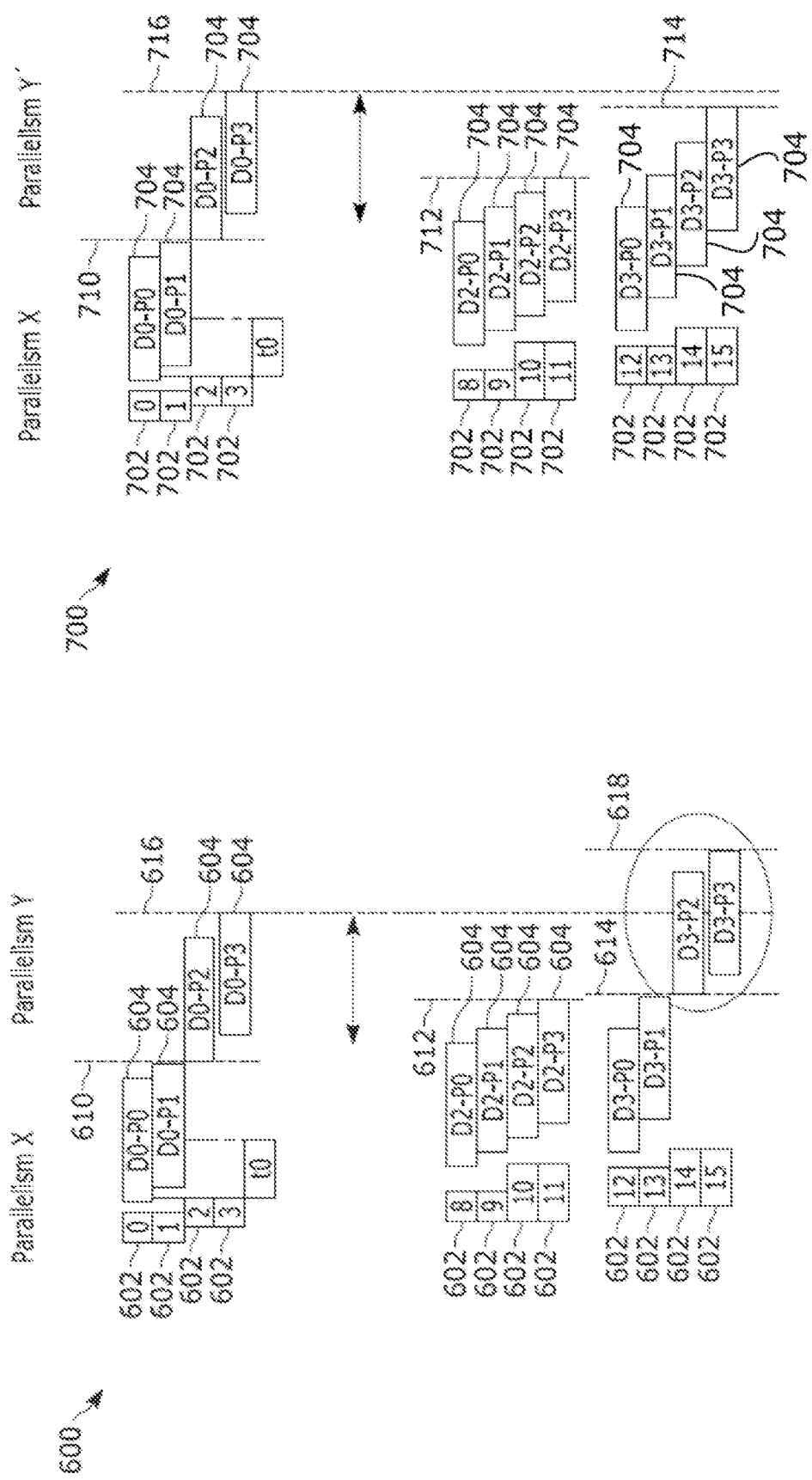
FIG. 6 is a diagram illustrating a second example of multi-commands, in accordance with various aspects of the present disclosure.
FIG. 7 is a diagram illustrating a third example of multi-commands, in accordance with various aspects of the present disclosure.

The issue with the channel transfers 206 is the saturation of the FIM 128. The present disclosure is focused on transferring data dynamically to saturate the memory 104 while reducing the saturation level of the FIM 128. For example, FIGS. 4, 6, and 7 illustrate a combination of commands into a "multi-command," which results in the memory 104 having less overheads. Additionally, the particular plane data may be read dynamically and multiple planes are available for tracking simultaneously.

FIG. 4 is a diagram illustrating a first example of multi-commands, in accordance with various aspects of the present disclosure. FIG. 4 is described with respect to FIG. 1.

In FIG. 4, the example 400 includes a plurality of sense commands 402, a plurality of data commands 404, and channel transfers 406. The plurality of sense commands 402 includes sense commands 0-15. The plurality of data commands 404 includes a first command D0-P0 (i.e., a command associated with die0 and plane0) corresponding to sense command 0. The plurality of data commands 404 includes sixteen total commands (i.e., first command D0-P0 through sixteenth command D3-P3), each of the sixteen commands corresponding to one of the sense commands.

In the example 400, similar to the example 200, the first sense command 0 is sent to the memory 104 to cause the memory 104 to sense the data (e.g., 4 KB of data). The sensed data is brought to the latches 113, 115, and 117, and transferring the data with data transfers Txfr0-TxfrN.

Additionally, in the example 400, similar to the example 200, after sending the plurality of sense commands 402, the plurality of data commands 404 are sent to the memory 104 across parallelism X, parallelism Y, and parallelism Z, where the plurality of data commands 404 are associated with the data transfer. Upon receiving the plurality of commands 404, the memory 104 makes sure that the die or independent plane with the data is ready for the data transfer. For example, the activity monitoring circuitry 142 checks whether the die or the independent plane with the data is ready for the data transfer.

The activity monitoring circuitry 142 may check the die or the independent plane continuously or based on trigger events. However, in the example 400, unlike the example 200, the plurality of data commands 404 are grouped into multiple commands (also referred to as "multi-commands") and spread across different parallelisms (e.g., parallelism X, parallelism Y, and parallelism Z). Therefore, the activity monitoring circuitry 142 may check the die or the independent plane after the completion of each of the multiple command. These checks by the activity monitoring circuitry 142 are indicated by the lines 410-420.

The following are checks with respect to parallelism X. The check line 410 indicates a check of die 0 and Planes 0 and 1 after the completion of the second command D0-P1 of the plurality of commands 404. The check line 412 indicates a check of die 1 and planes 0-3 after the completion of the eighth command D1-P3 of the plurality of commands 404. The check line 414 indicates a check of die 2 and planes 0-3 after the completion of the twelfth command D2-P3 of the plurality of commands 404. The check line 416 indicates a check of die 3 and Planes 0-2 after the completion of the fifteenth command D3-P2 of the plurality of commands 404.

The check line 418 is a check with respect to parallelism Y. The check line 418 indicates a check of die 0 and Planes 2 and 3 after the completion of the fourth command D0-P3 of the plurality of commands 404.

The check line 420 is a check with respect to parallelism Z. The check line 420 indicates a check of die 3 and plane 3 after the completion of the sixteenth command D3-P3 of the plurality of commands 404.

The commands associated with a particular die that is idle will have multiple planes associated with the commands. This association efficiency may be used to combine the commands into one or more multi-commands, each of the one or more multi-commands associated with different planes.

As explained above, a particular die may be checked to determine whether it is ready to be read, which indirectly checks whether all of the planes associated with the particular die are ready. During this period, other commands should not go to any of the planes of the particular die, otherwise the particular die being checked is not going to be ready.

For example, when extra bandwidth is available at the memory 104, and the memory 104 has 16× parallelism, but at any point in time, the memory 104 only needs to have 12×, 11×, or 8× parallelism. The 16× parallelism is not required all of the time. Therefore, the activity monitoring circuitry 142 determines how much parallelism at the memory 104 will saturate the FIM bus. That amount of parallelism may be set by the activity monitoring circuitry 142 or other suitable circuitry. Additionally, this specific amount of parallelism is used to combine the plurality of commands 404 into the multi-commands as well.

As illustrated in FIG. 2, the time t0 represents the time prior to receiving the third command D0-P2 of the plurality of commands 404. In the example of FIG. 2, due to the parallelism available in the memory 104 (e.g., parallelism X, parallelism Y, and parallelism Z), the activity monitoring circuitry 142 determines that the memory 104 may be better saturated by not combining the third command D0-P2 and the fourth command D0-P3 with the multi-command including the first command D0-P0 and the second D0-P1. Instead, the activity monitoring circuitry 142 determines that the memory 104 may be better saturated by pushing (also called "holding") the third command D0-P2 and the fourth command D0-P3 from the parallelism X to the parallelism Y. By pushing the third command D0-P2 and the fourth command D0-P3 from the parallelism X to the parallelism Y, the activity monitoring circuitry 142 may perform the check at the check line 410.

Although the activity monitoring circuitry 142 is described as pushing the third command D0-P2 and the fourth command D0-P3 into parallelism Y, the activity monitoring circuitry 142 may dynamically determine whether to push any of the commands of the plurality of commands 404 into different parallelisms. Therefore, the activity monitoring circuitry 142 implements multi-commands and may capitalize on the parallelisms available at the memory 104.

In the channel transfers 406, the overheads 408 represent the extra work that the memory 104 needs to do in order to transfer over the data from the memory 104 to the controller 106. In the example of FIG. 4, the overheads are less than the 40% to 50% of FIG. 2, and while the efficiency of the FIM 128 drops from 100%, the efficiency of the FIM 128 is higher than the 50% to 60% efficiency of FIG. 2. The increase in the efficiency of the FIM 128 is from the activity monitoring circuitry 142 implementing multi-commands and capitalizing on the parallelisms available at the memory 104.

Figure 5:
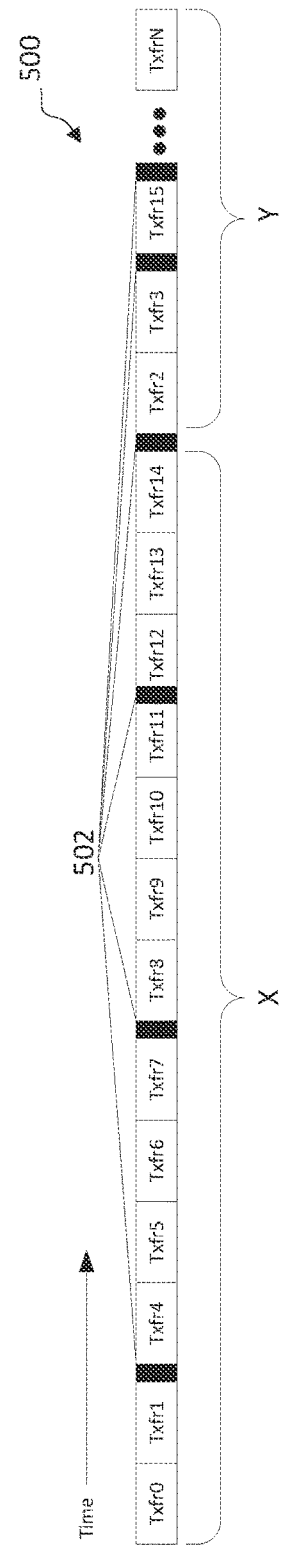
FIG. 5 is a diagram illustrating a first example of channel transfers from the multi-commands of FIG. 4, in accordance with various aspects of the present disclosure.

FIG. 5 is a diagram illustrating a first example 500 of channel transfers from the multi-commands of FIG. 4, in accordance with various aspects of the present disclosure. In the example 500, less than all of the data transfers Txfr0-TxfrN are associated with one of the plurality of overheads 502. In other words, N data transfers results in M overheads, where M is a positive integer that is less than N. Specifically, in the example 500, sixteen data transfers results in six overheads instead of sixteen overheads, which is a reduction of 62.5% over the example 300 of FIG. 3.

FIG. 6 is a diagram illustrating a second example 600 of multi-commands, in accordance with various aspects of the present disclosure. FIG. 6 is described with respect to FIGS. 1, 2, and 4.

In FIG. 6, the example 600 includes a plurality of sense commands 602 and a plurality of data commands 604. The plurality of sense commands 602 includes sense commands 0-15 (sense commands 4-7 are not illustrated). The plurality of data commands 604 includes a first command D0-P0 (i.e., a command associated with die0 and plane0) corresponding to sense command 0. The plurality of data commands 604 includes sixteen total commands (i.e., first command D0-P0 through sixteenth command D3-P3), each of the sixteen commands corresponding to one of the sense commands 602.

In the example 600, similar to the examples 200 and 400, the first sense command 0 is sent to the memory 104 to cause the memory 104 to sense the data (e.g., 4 KB of data). The sensed data is brought to the latches 113, 115, and 117, and transferring the data with data transfers Txfr0-TxfrN.

Additionally, in the example 600, similar to the examples 200 and 400, after sending the plurality of sense commands 602, the plurality of data commands 604 are sent to the memory 104 across different parallelisms (e.g., parallelism X and parallelism Y), where the plurality of data commands 604 are associated with the data transfer. Upon receiving the plurality of commands 604, the memory 104 makes sure that the die or independent plane with the data is ready for the data transfer. For example, the activity monitoring circuitry 142 checks whether the die or the independent plane with the data is ready for the data transfer.

Like the example 400, the plurality of data commands 604 are grouped into multi-commands and spread across different parallelisms (e.g., parallelism X and parallelism Y). Therefore, the activity monitoring circuitry 142 may check the die or the independent plane based on the completion of each of the multi-commands. These checks by the activity monitoring circuitry 142 are indicated by the lines 610-618.

The following are checks with respect to parallelism X. The check line 610 indicates a check of die 0 and planes 0 and 1 after the completion of the second command D0-P1 of the plurality of commands 604. The check line 612 indicates a check of die 2 and planes 0-3 after the completion of the twelfth command D2-P3 of the plurality of commands 604. The check line 614 indicates a check of die 3 and planes 0 and 1 after the completion of the fourteenth command D3-P1 of the plurality of commands 604.

The check line 616 is a check with respect to parallelism Y. The check line 616 indicates a check of die 0 and planes 2 and 3 after the completion of the fourth command D0-P3 of the plurality of commands 604.

The check line 618 is a check with respect to parallelism Z. The check line 618 indicates a check of die 3 and planes 2 and 3 after the completion of the sixteenth command D3-P3 of the plurality of commands 604.

As illustrated in FIG. 6, the fifteenth command D3-P2 and the sixteenth command D3-P3 are pushed and would be performed during the check line 616. The performance of the fifteenth command D3-P2 and the sixteenth command D3-P3 would render planes 2 and 3 unavailable and conflicts with the check associated with the check line 616. In other words, an unnecessary overhead would occur from the check associated with the check line 616.

Moreover, another check of the planes 2 and 3 would need to be performed after completion of the sixteenth command D3-P3. Therefore, the timing of commands in various planes impacts all commands associated with the same plane.

FIG. 7 is a diagram illustrating a third example 700 of multi-commands, in accordance with various aspects of the present disclosure. FIG. 7 is similar to FIG. 6, and consequently, redundant description is not repeated.

However, one difference between the third example 700 of FIG. 7 with respect to the second example 600 of FIG. 6 is the fifteenth command D3-P2 and the sixteenth command D3-P3 being grouped into a multi-command with the thirteenth command D3-P0 and the fourteenth command D3-P1 in parallelisms X and Y, instead of being pushed into parallelism Z. Therefore, the multi-command including the thirteenth command D3-P0, the fourteenth command D3-P1, the fifteenth command D3-P2, and the sixteenth command D3-P3 are performed before the check associated with the check line 716.

The performance of the fifteenth command D3-P2 and the sixteenth command D3-P3 prior to the check associated with the check line 716 would render planes 2 and 3 available and avoids any conflicts with planes 2 and 3. Therefore, there is no unnecessary overhead that occurs after the fourteenth command D3-P1 as in the second example 600 of FIG. 6 and a single overhead occurs after completion of the sixteenth command D3-P3.

FIG. 8 is a diagram illustrating a second example 800 of channel transfers from the multi-commands of FIG. 6, in accordance with various aspects of the present disclosure. In the second example 800, less than all of the data transfers Txfr0-TxfrN are associated with one of the plurality of overheads 802. In other words, N data transfers results in M overheads, where M is a positive integer that is less than N. Specifically, in the second example 800, sixteen data transfers results in five overheads instead of sixteen overheads, which is a reduction of 68.75% over the example 300 of FIG. 3.

FIG. 9 is a diagram illustrating a third example of channel transfers from the multi-commands of FIG. 7, in accordance with various aspects of the present disclosure. In the third example 900, less than all of the data transfers Txfr0-TxfrN are associated with one of the plurality of overheads 902. In other words, N data transfers results in M overheads, where M is a positive integer that is less than N. Specifically, in the third example 900, sixteen data transfers results in three overheads instead of sixteen overheads, which is a reduction of 81.25% over the example 300 of FIG. 3.

Figure 10:
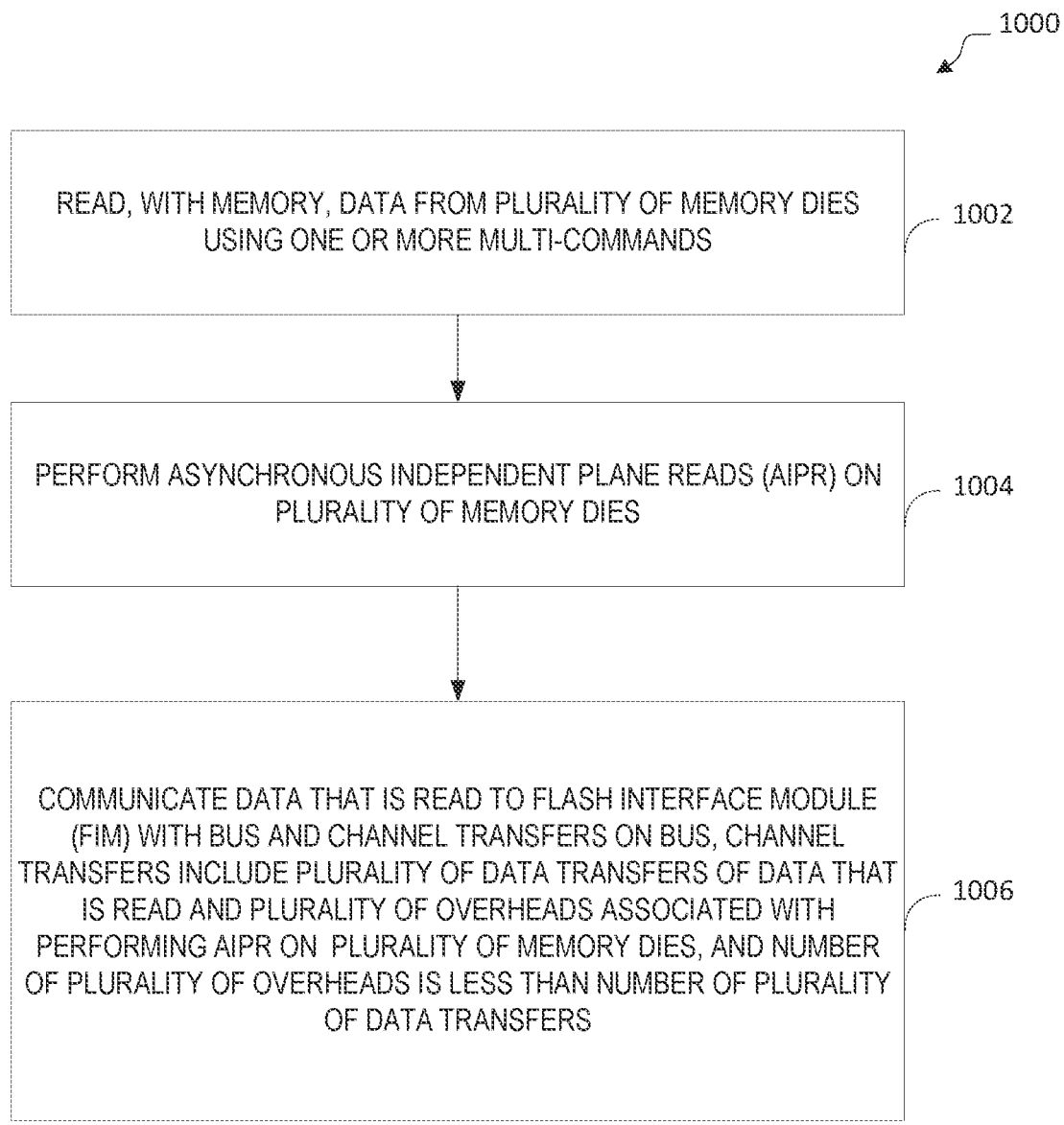
FIG. 10 is a flowchart illustrating an example process for reducing saturation of a flash interface module (FIM), in accordance with various aspects of the present disclosure.

FIG. 10 is a flowchart illustrating an example process 1000 for reducing saturation of a flash interface module (FIM), in accordance with various aspects of the present disclosure. FIG. 10 is described with respect to FIGS. 1 and 4.

The process 1000 includes reading, with a memory, data from a plurality of memory dies using one or more multi-commands (at block 1002). For example, the read/write circuitry 140 read data from the memory dies 103 using one or more multi-commands (e.g., one or more of a first multi-command including commands D0-P0 and D0-P1, a second multi-command including commands D1-P0-D1-P3, a third multi-command including commands D2-P0 and D2-P3, a fourth multi-command including commands D3-P0 and D3-P2, and a fifth multi-command including commands D0-P2 and D0-P3).

The process 1000 includes performing asynchronous independent plane reads (AIPR) on a plurality of memory dies (at block 1004). For example, the activity monitoring circuitry 142 performs the AIPR on the memory dies 103.

The process 1000 also includes communicating the data that is read to a flash interface module (FIM) with a bus and channel transfers on the bus, the channel transfers include a plurality of data transfers of the data that is read and a plurality of overheads associated with performing the AIPR on the plurality of memory dies, and a number of the plurality of overheads is less than a number of the plurality of data transfers (at block 1006). For example, the latches 113, 115, and 117 communicate data that is read to the FIM 128 with the bus 105 and the channel transfers 406 on the bus 105, the channel transfers 406 include a plurality of data transfers Txfr0-TxfrN and a plurality of overheads 408 associated with performing the AIPR on the memory dies 103, and a number of the plurality of overheads 408 is less than a number of the plurality of data transfers Txfr0-TxfrN.

In some examples, two or more of the plurality of data transfers and one of the plurality of overheads are associated with one of the one or more multi-commands. For example, two or more of the plurality of data transfers Txfr0-TxfrN and one of the plurality of overheads 408 are associated with one of the one or more multi-commands (e.g., one of a first multi-command including commands D0-P0 and D0-P1, a second multi-command including commands D1-P0-D1-P3, a third multi-command including commands D2-P0 and D2-P3, a fourth multi-command including commands D3-P0 and D3-P2, and a fifth multi-command including commands D0-P2 and D0-P3).

In some examples, the process 1000 further includes determining whether a current parallelism at the plurality of memory dies is enough to saturate the FIM, determining whether new commands are issued after a time window, and holding the new commands for a period of time in response to determining that the current parallelism at the plurality of memory dies is enough to saturate the FIM and in response to determining that the new commands are issued after the time window. For example, the process 1000 further includes determining whether a current parallelism at the memory dies 103 is enough to saturate the FIM 128, determining whether new commands D0-P2 and D0-P3 are issued after a time window t0, and holding the new commands D0-P2 and D0-P3 for a period of time in response to determining that the current parallelism at the memory dies 103 is enough to saturate the FIM 128 and in response to determining that the new commands D0-P2 and D0-P3 are issued after the time window t0.

In some examples, the process 1000 further includes controlling issuance of a plurality of commands to the plurality of memory dies, and maintaining a time window to issue new commands on a different plane. For example, the process 1000 further includes controlling issuance of a plurality of commands 404 to the memory dies 103, and maintaining a time window t0 to issue new commands D0-P2 and D0-P3 on a different plane.

In these examples, controlling the issuance of the plurality of commands to the plurality of memory dies further includes tracking all of the plurality of commands simultaneously. Additionally or alternatively, in these examples, controlling the issuance of the plurality of commands to the plurality of memory dies further includes: determining whether a saturation level of the FIM is one of undersaturated, saturated, or oversaturated, and controlling the issuance of the plurality of commands to the plurality of memory dies based on the determination of whether the saturation level of the FIM is the one of the undersaturated, saturated, or oversaturated.

In some examples, the process 1000 further includes dynamically determining a parallelism of the plurality of memory dies that can saturate the FIM based on a speed of the bus, a total number of outstanding commands available at the FIM, and a total number of commands available in the data storage device; and setting the parallelism that is dynamically determined.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device comprising:
   a memory including a plurality of memory dies, the memory configured to:
      read data from the plurality of memory dies using one or more multi-commands, and
      perform asynchronous independent plane reads (AIPR) on the plurality of memory dies;
   a data storage controller including a flash interface module (FIM) configured to communicate with the memory using a bus and channel transfers on the bus,
   wherein the channel transfers include a plurality of data transfers of the data that is read and a plurality of overheads associated with performing the AIPR on the plurality of memory dies, and
   wherein a number of the plurality of overheads is less than a number of the plurality of data transfers; and
   circuitry configured to:
      determine whether a current parallelism at the plurality of memory dies is enough to saturate the FIM,
      determine whether new commands are issued after a time window, and
      hold the new commands for a period of time in response to determining that the current parallelism at the plurality of memory dies is enough to saturate the FIM and in response to determining that the new commands are issued after the time window.

2. The data storage device of claim 1, wherein two or more of the plurality of data transfers and one of the plurality of overheads are associated with one of the one or more multi-commands.

3. The data storage device of claim 1,
   wherein the circuitry is further configured to:
      control issuance of a plurality of commands to the plurality of memory dies, and
      maintain a time window to issue new commands on a different plane.

4. The data storage device of claim 3, wherein, to control issuance of the plurality of commands to the plurality of memory dies, the circuitry is further configured to track all of the plurality of commands simultaneously.

5. The data storage device of claim 3, wherein, to control issuance of the plurality of commands to the plurality of memory dies, the circuitry is further configured to
   determine whether a saturation level of the FIM is one of undersaturated, saturated, or oversaturated, and
   control the issuance of the plurality of commands to the plurality of memory dies based on the determination of whether the saturation level of the FIM is the one of the undersaturated, the saturated, or the oversaturated.

6. The data storage device of claim 1, further comprising:
   circuitry configured to:
      dynamically determine a parallelism of the plurality of memory dies that can saturate the FIM based on a speed of the bus, a total number of outstanding commands available at the FIM, and a total number of commands available in the data storage device, and
      set the parallelism that is dynamically determined.

7. A method comprising:
   reading, with a memory, data from a plurality of memory dies using one or more multi-commands;
   performing asynchronous independent plane reads (AIPR) on the plurality of memory dies;
   communicating the data that is read to a flash interface module (FIM) with a bus and channel transfers on the bus,
   wherein the channel transfers include a plurality of data transfers of the data that is read and a plurality of overheads associated with performing the AIPR on the plurality of memory dies, and
   wherein a number of the plurality of overheads is less than a number of the plurality of data transfers;
   determining whether a current parallelism at the plurality of memory dies is enough to saturate the FIM;
   determining whether new commands are issued after a time window; and
   holding the new commands for a period of time in response to determining that the current parallelism at the plurality of memory dies is enough to saturate the FIM and in response to determining that the new commands are issued after the time window.

8. The method of claim 7, wherein two or more of the plurality of data transfers and one of the plurality of overheads are associated with one of the one or more multi-commands.

9. The method of claim 7, further comprising:
   controlling issuance of a plurality of commands to the plurality of memory dies; and
   maintaining a time window to issue new commands on a different plane.

10. The method of claim 9, wherein controlling the issuance of the plurality of commands to the plurality of memory dies further includes tracking all of the plurality of commands simultaneously.

11. The method of claim 9, wherein controlling the issuance of the plurality of commands to the plurality of memory dies further includes:

determining whether a saturation level of the FIM is one of undersaturated, saturated, or oversaturated, and controlling the issuance of the plurality of commands to the plurality of memory dies based on the determination of whether the saturation level of the FIM is the one of the undersaturated, the saturated, or the oversaturated.

12. The method of claim 7, further comprising:

dynamically determining a parallelism of the plurality of memory dies that can saturate the FIM based on a speed of the bus, a total number of outstanding commands available at the FIM, and a total number of commands available in a data storage device; and setting the parallelism that is dynamically determined.

13. An apparatus comprising:

means for reading data from a plurality of memory dies using one or more multi-commands;

means for performing asynchronous independent plane reads (AIPR) on the plurality of memory dies;

means for communicating the data that is read to a flash interface module (FIM) with a bus and channel transfers on the bus, wherein the channel transfers include a plurality of data transfers of the data that is read and a plurality of overheads associated with performing the AIPR on the plurality of memory dies, and wherein a number of the plurality of overheads is less than a number of the plurality of data transfers;

determining whether a current parallelism at the plurality of memory dies is enough to saturate the FIM;

determining whether new commands are issued after a time window; and holding the new commands for a period of time in response to determining that the current parallelism at the plurality of memory dies is enough to saturate the FIM and in response to determining that the new commands are issued after the time window.

14. The apparatus of claim 13, wherein two or more of the plurality of data transfers and one of the plurality of overheads are associated with one of the one or more multi-commands.

15. The apparatus of claim 13, further comprising:

controlling issuance of a plurality of commands to the plurality of memory dies; and maintaining a time window to issue new commands on a different plane.

16. The apparatus of claim 13, further comprising:

means for dynamically determining a parallelism of the plurality of memory dies that can saturate the FIM based on a speed of the bus, a total number of outstanding commands available at the FIM, and a total number of commands available in a data storage device; and means for setting the parallelism that is dynamically determined.

17. An apparatus comprising:

means for reading data from a plurality of memory dies using one or more multi-commands;

means for performing asynchronous independent plane reads (AIPR) on the plurality of memory dies;

means for communicating the data that is read to a flash interface module (FIM) with a bus and channel transfers on the bus, wherein the channel transfers include a plurality of data transfers of the data that is read and a plurality of overheads associated with performing the AIPR on the plurality of memory dies, and wherein a number of the plurality of overheads is less than a number of the plurality of data transfers;

controlling issuance of a plurality of commands to the plurality of memory dies; and maintaining a time window to issue new commands on a different plane, wherein controlling the issuance of the plurality of commands to the plurality of memory dies further includes:

determining whether a saturation level of the FIM is one of undersaturated, saturated, or oversaturated, and controlling the issuance of the plurality of commands to the plurality of memory dies based on the determination of whether the saturation level of the FIM is the one of the undersaturated, the saturated, or the oversaturated.

* * * * *